United States Patent
Austen et al.

(10) Patent No.: US 7,844,866 B2
(45) Date of Patent: Nov. 30, 2010

(54) MECHANISM TO REPORT OPERATING SYSTEM EVENTS ON AN INTELLIGENT PLATFORM MANAGEMENT INTERFACE COMPLIANT SERVER

(75) Inventors: Christopher Harry Austen, Pflugerville, TX (US); Garry Michael Kump, Apex, NC (US); Kanisha Patel, Austin, TX (US); Christopher T. Schnorr, New Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 11/865,772

(22) Filed: Oct. 2, 2007

(65) Prior Publication Data

US 2009/0089624 A1   Apr. 2, 2009

(51) Int. Cl.
G06F 11/00 (2006.01)
(52) U.S. Cl. .............. 714/57; 714/4; 714/25; 714/37; 714/47
(58) Field of Classification Search ......... 714/57
See application file for complete search history.

(56) References Cited

U.S. PATENT DOCUMENTS

| | | | |
|---|---|---|---|
| 6,904,391 B2 | 6/2005 | Merkin et al. | |
| 6,948,094 B2 | 9/2005 | Schultz et al. | |
| 7,051,363 B2 | 5/2006 | Cheng et al. | |
| 7,127,722 B2 | 10/2006 | Cheng et al. | |
| 7,188,171 B2 | 3/2007 | Srinivasan et al. | |
| 2004/0249913 A1 | 12/2004 | Kaufman, Jr. | |
| 2005/0137833 A1 | 6/2005 | Sistla | |
| 2005/0267956 A1* | 12/2005 | Huang | 709/223 |
| 2006/0010352 A1* | 1/2006 | Mukherjee et al. | 714/47 |
| 2006/0106577 A1* | 5/2006 | Hatakeyama | 702/183 |
| 2006/0167919 A1 | 7/2006 | Hsieh | |
| 2006/0208286 A1 | 9/2006 | Shimada | |
| 2007/0061634 A1 | 3/2007 | Marisetty et al. | |
| 2007/0088816 A1 | 4/2007 | Hrustemovic et al. | |
| 2008/0043769 A1* | 2/2008 | Hirai | 370/420 |
| 2008/0155300 A1* | 6/2008 | Yang | 714/1 |
| 2008/0209280 A1* | 8/2008 | Dilillo et al. | 714/48 |
| 2009/0089624 A1* | 4/2009 | Austen et al. | 714/39 |

OTHER PUBLICATIONS

Slaight, "Intelligent Chassis Management Bus (ICMB) v1.0 Overview", Feb. 1999, Intel Corporation.
"VadaTech Comprehensive IPMI solution for OEM", pp. 1-6, VadaTech Technology.
"PC87431MAT/SAT/CAT mini-Baseboard Management Controller (mBMC)", Feb. 2006, pp. 1-6, Winbond Electronics Corporation.
Schmidt, "HPI as an interface to ATCA and other blade-based servers", Service Availability Forum.

* cited by examiner

*Primary Examiner*—Emerson C Puente
(74) *Attorney, Agent, or Firm*—Yee & Associates, P.C.; Libby Z. Toub

(57) ABSTRACT

The exemplary embodiments provide a computer-implemented method, apparatus, and computer-usable program code for reporting operating system faults on an Intelligent Platform Management Interface compliant server. In response to receiving an alert for an operating system fault, the alert for the operating system fault is converted into an IPMI event. The IPMI event is stored in an internal event log. An IPMI system event record is created for the IPMI event. The IPMI event is sent to a host management controller in order to enable monitoring of the operating system fault.

20 Claims, 5 Drawing Sheets

SENSOR DATA RECORD
400

SDR TYPE 0x03 - EVENT ONLY RECORD (SECTION 37-3 OF IPMI v1.5 SPEC)  402

| BYTE | FIELD | SIZE | DESCRIPTION |
|---|---|---|---|
| 1:2 | RECORD ID | 2 | USE NEXT AVAILABLE RECORD ID |
| 3 | SDR VERSION | 1 | SET TO x51 |
| 4 | RECORD TYPE | 1 | SET TO x03 |
| 5 | RECORD LENGTH | 1 | SET TO x1C |
| 6 | SENSOR OWNER ID | 1 | SET TO x20 |
| 7 | SENSOR OWNER LUN | 1 | SET TO x00 |
| 8 | SENSOR NUMBER | 1 | SENSOR NUMBER ASSOCIATED WITH THIS SDR |
| 9 | ENTITY ID | 1 | TABLE 37-13 OF IPMI v1.5 SPEC. x23 FOR OPERATING SYSTEM |
| 10 | ENTITY INSTANCE | 1 | SET TO x01 |
| 11 | SENSOR TYPE | 1 | TABLE 36-3 OF IPMI v1.5 SPEC. xC0 FOR OEM OS REPORTING SENSOR FOR THIS PARTICULAR SYSTEM |
| 12 | EVENT/READING TYPE CODE | 1 | TABLE 36-1 OF IPMI v1.5 SPEC. x6F FOR SENSOR-SPECIFIC DISCRETE |
| 13:14 | SENSOR RECORD SHARING | 2 | SET TO x00 x00 |
| 15 | RESERVED | 1 | SET TO x00 |
| 16 | OEM | 1 | SET TO x00 (UNUSED) |
| 17 | ID STRING TYPE/LENGTH CODE | 1 | SENSOR ID STRING TYPE/LENGTH CODE FORMAT FROM SECTION 37.15 OF IPMI v1.5 SPEC. SET TO xD0 |
| 18:33 | ID STRING BYTES | 16 | "OEM OS REPORTING" |

*FIG. 4*

TABLE 600

| OFFSET | EVENT |
|---|---|
| x0 | OS DETECTED FAULT. SEE OS ERROR LOG FOR MORE DETAILS. |

*FIG. 6*

SYSTEM EVENT
LOG RECORD
500

| _____ SDR TYPE 0x03 - EVENT ONLY RECORD (SECTION 26.1 OF IPMI V1.5 SPEC) _____ ||||
| 504 | 506 | 508 | 510                                                                                                                                                                                                                                                       502 |
|------|-----------------------|------|------|
| BYTE | FIELD | SIZE | DESCRIPTION |
| 1:2 | SEL RECORD ID | 2 | SET TO x00 x00 |
| 3 | DIRECTED EVENT TYPE | 1 | SET TO x02 = SYSTEM EVENT RECORD |
| 4:7 | TIMESTAMP | 4 | LS BYTE FIRST |
| 8:9 | GENERATOR ID | 2 | SET TO x20 x00 |
| 10 | EvM REV | 1 | SET TO x04 |
| 11 | SENSOR TYPE | 1 | SET TO xC0 = OEM |
| 12 | SENSOR NUMBER | 1 | USE SENSOR NUMBER FROM THE SDR |
| 13 | EVENT DIR \| EVENT TYPE | 1 | BIT 7 = 0 = ASSERT. NO NEED TO DEASSERT.<br>BITS 6:0 = x6F = USE SENSOR SPECIFIC TYPE CODE FROM TABLE 36-3 |
| 14 | EVENT DATA 1 | 1 | FOR OEM SENSOR TYPE, USE OEM EVENT DATA FIELD FORMAT.<br>BITS 7:6 = 01b = SEVERITY IN EVENT DATA 2<br>BITS 5:4 = 00b = UNSPECIFIED EVENT DATA 3<br>BITS 3:0 = x0. MM WILL LOG THE MESSAGE DESCRIBED IN OFFSET x0 (BELOW) |
| 15 | EVENT DATA 2 | 1 | THE OFFSET OF EVENT TYPE CODE x07 FROM TABLE 36-2 OF IPMI v1.5 SPEC WILL BE IN THE HIGH NIBBLE AND WILL SET THE PROPER SEVERITY OF THE MESSAGE. THE MM EVENT LOG MESSAGE WILL BE:<br>x1F = OFFSET x01 = YELLOW W FOR WARNING<br>x5F = OFFSET x05 = RED E FOR ERROR<br>x8F = OFFSET x08 = BLACK I FOR INFORMATIONAL |
| 16 | EVENT DATA 3 | 1 | SET TO xFF |

MECHANISM TO REPORT OPERATING SYSTEM EVENTS ON AN INTELLIGENT PLATFORM MANAGEMENT INTERFACE COMPLIANT SERVER

BACKGROUND OF THE INVENTION

1. Field of the Invention

The present invention is related generally to a server system. More particularly, the present invention is directed to a computer-implemented method, apparatus, and computer-usable program code for reporting operating system events on an IPMI compliant server.

2. Description of the Related Art

Server system management is used primarily for monitoring the health of a system, reporting current states and alerting of problems. In an Intelligent Platform Management Interface (IPMI) server, system management is performed by a Baseboard Management Controller (BMC). The Baseboard Management Controller monitors many components directly mounted on the server motherboard or adapter cards connected to the motherboard, and can also be used by other component firmware to pass events to a host management controller. A motherboard is the main circuit board in a data processing system. The motherboard houses a variety of microchips, sockets, and plugs, and plays an integral part in connecting all of a data processing system together. An event is a condition detected by a sensor, usually indicating that a problem has occurred.

In a blade center, the host management controller would be the Management Module (MM). Blade centers are self-contained computer servers, designed for high density. Blade centers have several servers, or blades, mounted in the center with one or more centralized Management Modules that monitor and control the individual blades, I/O switches, power, cooling, etc. The individual blade servers are sometimes referred to as field replaceable units (FRUs) because they can be quickly and easily removed and replaced by the user or by a technician without having to send the entire blade center to a repair facility. In other rack mounted type server systems, the host management controller could be implemented in any one of the servers or in a separate data processing system connected to the rack mounted server system. In other types of servers, the host management controller is part of a designated server within the server system.

The events that can generate an alert are defined in the Intelligent Platform Management Interface specification and are critical to the monitoring, maintenance, performance, and reliability of the server. An alert is the mechanism for reporting an event.

Although there are many standard entities defined for the Baseboard Management Controller to monitor and generate an alert, there are no entities defined for reporting operating system (OS) software events, such as informational, warnings, faults, and so forth. The reporting of operating system related events can be invaluable for system operators performing server system management, especially remotely through a host management controller. Currently the only way for a user or operator to know about an operating system event is to have the operating system visible and react on any events the operating system detects and reports through the operating system's own user interface or a command line.

SUMMARY OF THE INVENTION

The exemplary embodiments provide a computer-implemented method, apparatus, and computer-usable program code for reporting operating system faults on an Intelligent Platform Management Interface compliant server. In response to receiving an alert for an operating system fault, the alert for the operating system fault is converted into an IPMI event. The IPMI event is stored in an internal event log. An IPMI system event record is created for the IPMI event. The IPMI event is sent to a host management controller in order to enable monitoring of the operating system fault.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram of a sensor data record for reporting operating system events in accordance with an exemplary embodiment;

FIG. 5 is a block diagram of a system event log record format for reporting operating system events in accordance with an exemplary embodiment;

FIG. 6 is a block diagram of an offset table in accordance with an exemplary embodiment;

DETAILED DESCRIPTION OF THE PREFERRED EMBODIMENT

Figure 1:
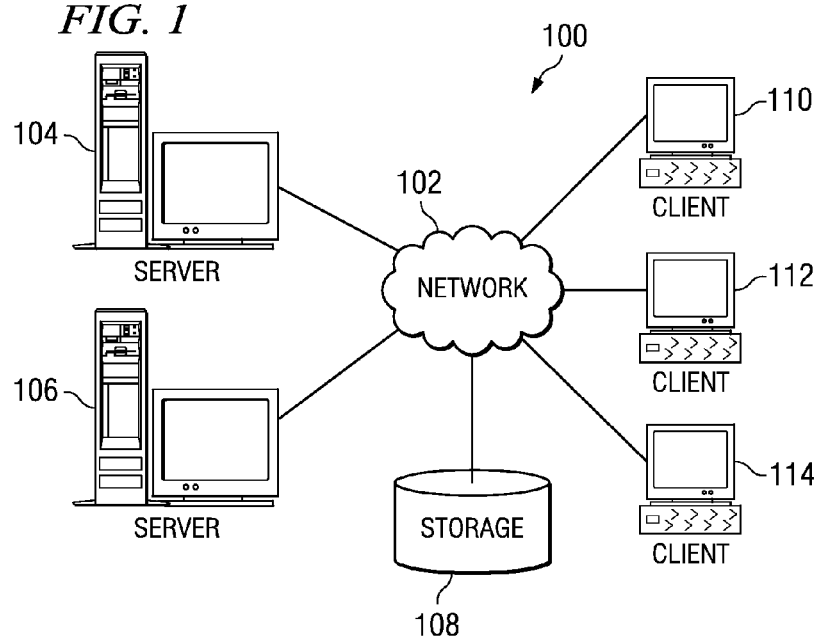
FIG. 1 is a pictorial representation of a network of data processing systems in which illustrative embodiments may be implemented.
Figure 2:
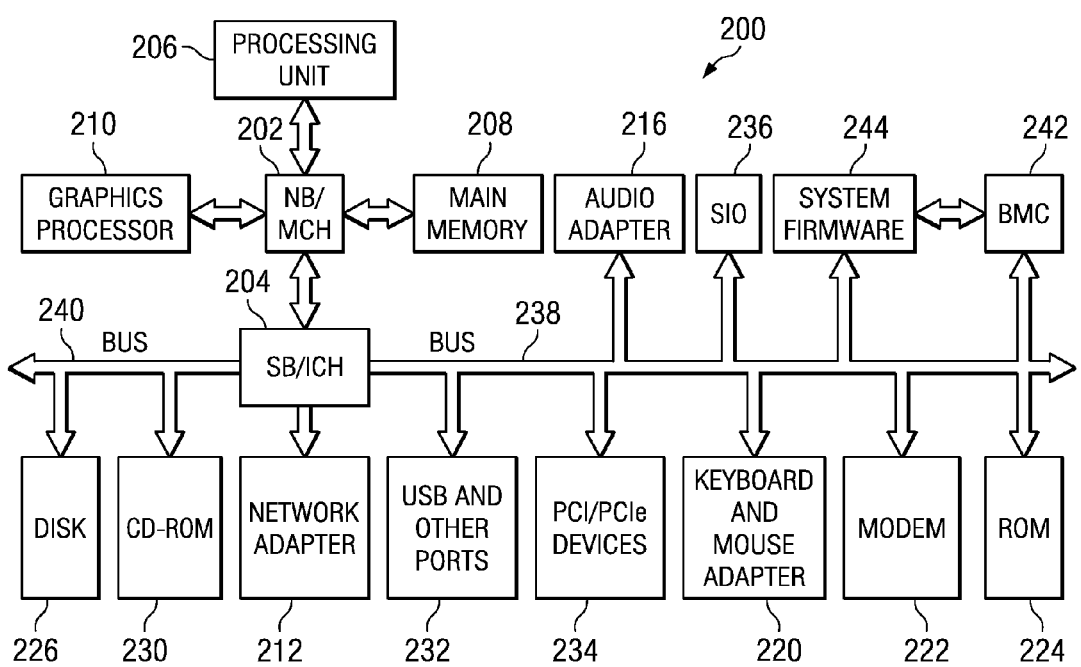
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The Baseboard Management Controller, BMC 242, is a microprocessor that has the ability to monitor other components on the motherboard. BMC 242 can access components for reading temperatures, voltages, and so forth. Additionally, BMC 242 has a channel to system firmware 244. This channel allows system firmware 244 to tell BMC 242 information BMC 242 can not receive directly, such as, for example, operating system faults. System firmware 244 is a small microprocessor that resides on the motherboard.

Exemplary embodiments provide for reporting operating system events on an IPMI compliant server. Exemplary embodiments take advantage of the ability of the system firmware, also known as BIOS, running on the server to interface to both the operating system that is running on that server, and to the BMC, which then interfaces to a host management controller, the Management Module. An IPMI compliant server uses sensor data records (SDRs) and system event log(SEL) records, which are both defined in the IPMI specification, to define what events to monitor and how to alert on the events that are being monitored.

Exemplary embodiments implement an IPMI original equipment manufacturer (OEM) event reporting mechanism, called a sensor, that provides for the host management controller being alerted of operating system related events. In the present context, an OEM event reporting mechanism is something that is not part of the IPMI specification standard functionality. Rather it is a capability provided by the IPMI specification standard to allow a manufacturer to implement unique and/or specific functions. The alert is passed from the operating system to the system firmware and then to the BMC, which notifies the host management controller, the Management Module. Since the operating system is not IPMI compliant, when an operating system fault occurs, the operating system reports the fault to the system firmware via an internal alerting mechanism. The system firmware is capable of communicating an IPMI event to the BMC via an alert to the BMC. The BMC then reports the IPMI event upstream to the host management controller via a sensor alert. The host management controller may then pass the event on to other components as necessary.

Specifically, the BMC employs a sensor that monitors for the operating system fault. In general, an IMPI sensor defines what hardware components the server is monitoring and identifies for which IPMI events the BMC can generate an alert for that hardware. Exemplary embodiments use the OEM sensor capabilities of IPMI to define a software sensor for reporting operating system faults. Being an OEM sensor, the sensor is specific to the BMC and system firmware of the server, and to the host management controller, all of which need to adhere to the definition of the OEM sensor in order to properly interface, that is monitor and report, to each other.

Exemplary embodiments provide for an IMPI OEM sensor that utilizes SDRs, SEL records, and a sensor-specific offset table to define what to monitor and how to alert on what is being monitored. The SDR, SEL record, and sensor-specific offset table are published in the system specification for the IPMI compliant server and the host management controller. Any system management software would need to add support for the sensor events if the system management software desires to be alerted for the sensor events and to report on the sensor events.

When the IPMI OEM sensor either detects a fault or is alerted about an operating system fault, the IPMI OEM sensor generates an alert and creates a system event log (SEL) record for the operating system fault. The operating system events are reported by the BMC like other IPMI events that are being monitored and reported, having the same look and feel, and can be handled by any IPMI compliant management software. The messages being logged by the host management controller have severity levels associated with each event that the BMC sends, further clarifying the urgency of the operating system event to the operator monitoring a server.

The system firmware can indicate to the BMC the proper offset to use for the proper message to be logged. The BMC receives the alert for the operating system fault from the system firmware, builds the proper SEL record, sets the severity level accordingly, and sends the SEL record to the host management controller as a sensor event via a messaging command. The host management controller receives the sensor event and logs the appropriate message using the offset, and marks it with the severity level indicated in the SEL. Because these alerts are for IPMI sensor events, any IPMI host management software that is monitoring the system will get the notification and can react accordingly.

Figure 3:
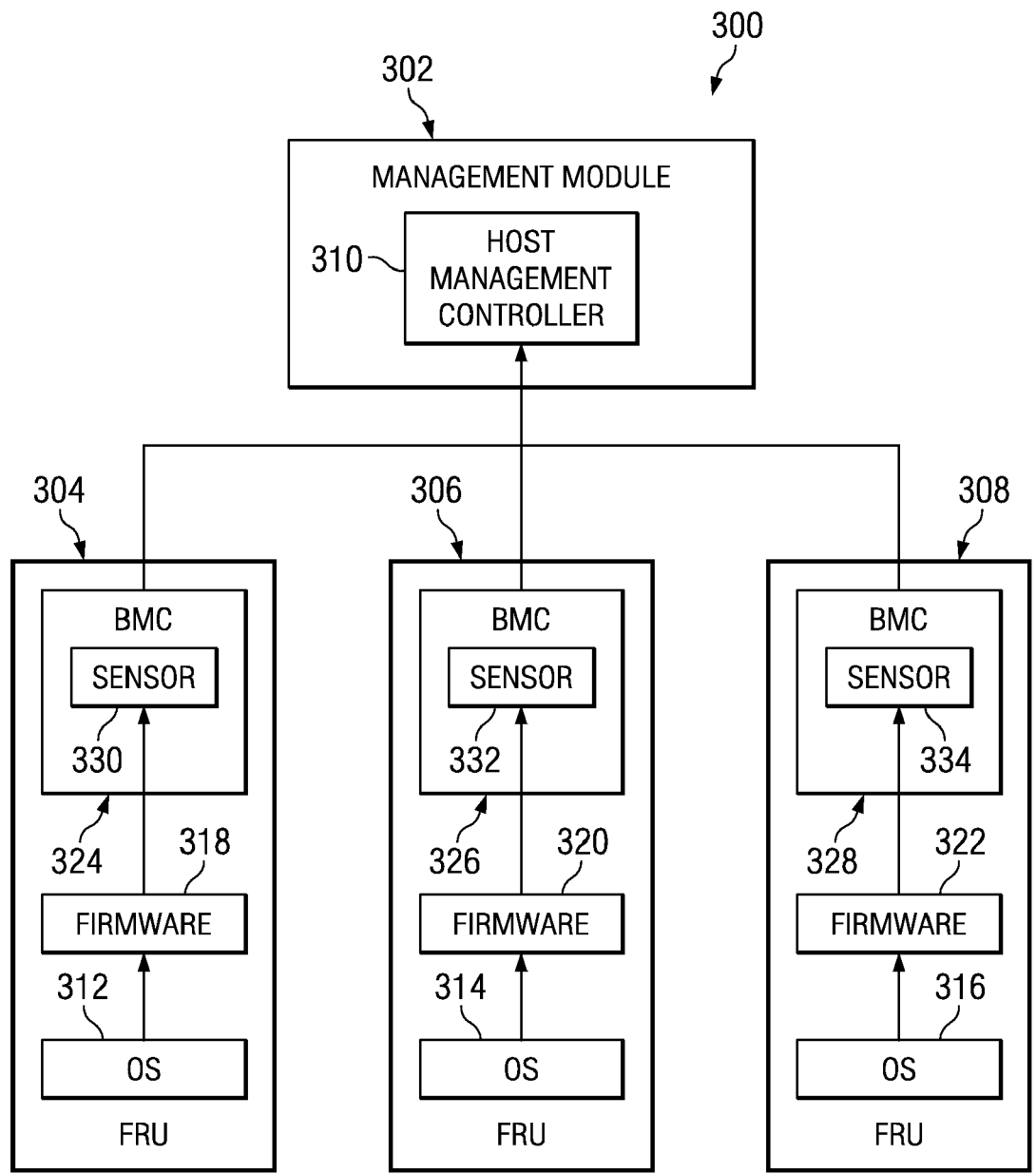
FIG. 3 is a block diagram illustrating a system for reporting operating system events on an IPMI compliant server in accordance with an exemplary embodiment.

Turning back to the figures, FIG. 3 is a block diagram illustrating a system for reporting operating system events on an IPMI compliant server in accordance with an exemplary embodiment. System 300 comprises a Management Module 302, and three IPMI compliant servers, FRU 304, FRU 306 and FRU 308. FRUs 304, 306, and 308 may be implemented as data processing systems, such as data processing system 200 in FIG. 2.

While system 300 is depicted as comprising three field replacement units, exemplary embodiments contemplate system 300 comprising any number of field replacement units, or servers, from one to hundreds or more. Currently, the most blades (field replacement units) that can fit in a chassis are fourteen (14). A chassis is a framework for mounting the components of an electronic device. A Management Module only controls those blades that are mounted in the chassis of the Management Module. However, server management software that is IPMI compliant can connect to any number of chassis and be fed blade server information through the Management Module.

The architecture depicted in FIG. 3 is not intended to in any way limit the implementation of exemplary embodiments. Additionally, while system 300 depicts host management controller 310 as residing in Management Module 302, alternate embodiments contemplate implementing the host management controller in one or more servers, such as the field replacement units for rack mounted server systems or stand-alone servers in other server systems. Another alternate embodiment contemplates implementing the host management controller on a data processing system that is remote to a server system.

Management Module 302 comprises host management controller 310. Each IPMI compliant server, FRUs 304, 306 and 308 comprises an operating system, operating systems 312, 314, and 316 respectively, system firmware, firmwares 318, 320, and 322 respectively, and a Baseboard Management Controller, BMCs 324, 326, and 328 respectively. Each BMC comprises many sensors. In the present example, sensors 330, 332, and 334 respectively, are shown to illustrate a single communication path connecting the operating system to the system firmware to the BMC to the MM in each field replacement unit.

The operating system alerts the firmware that a fault has occurred. The system firmware then alerts the Baseboard Management Controller of the operating system fault. Specifically, the system firmware alerts a sensor within the Baseboard Management Controller that the operating system fault has occurred. The Baseboard Management Controller then communicates the operating system fault to the host management controller.

Thus, in FIG. 3, if operating system 312 detects a fault, operating system 312 alerts firmware 318 of the operating system fault. Firmware 318, in turn, alerts sensor 330 of BMC 324 of the operating system fault. BMC 324 formats the alert into an IPMI SEL sensor event and alerts host management controller 310. Host management controller 310 writes the SEL to an internal event log and can forward the alert to any other host management software that is interfacing with host management controller 310.

FIG. 4 is a block diagram of a sensor data record for reporting operating system events in accordance with an exemplary embodiment. Sensor data record 400 comprises header 402, byte column 404, field type 406, size 408, and description 410. FIG. 4 may be implemented in a BMC, such as BMC 324 of FIG. 3. Field type 406 is a column that comprises a set of cells, wherein each cell comprises the name of a field comprising the 8 bits of a byte. Field type 406 simply contains the name of the field, which is further clarified by the description contained in the description 410 column. Byte column 404 comprises a set of cells, wherein each cell comprises the location of the byte within the record that make up the corresponding field in the cell of column field type 406. Size 408 comprise a set of cells, wherein the cells comprise a number that corresponds to the number of bytes that comprise the corresponding cell of the byte column 404. Description 410 comprises a set of cells, wherein the cells comprise a description of type of field in column field type 406.

FIG. 5 is a block diagram of a system event log record format for reporting operating system events in accordance with an exemplary embodiment. System event log record 500 comprises header 502 byte column 504, field type 506, size 508, and description 510. FIG. 5 may be implemented in a BMC, such as BMC 324 of FIG. 3. Field 506 is a column that comprises a set of cells, wherein each cell comprises the name of a field comprising the 8 bits of a byte. Byte column 504 comprises a set of cells, wherein each cell comprises the location of the byte within the record that make up the corresponding field in the cell of the column field type 506. Size 508 comprise a set of cells, wherein the cells comprise a number that corresponds to the number of bits that comprise the corresponding field type 506 cell. Description 510 comprises a set of cells describing the actual contents of the cell for each type of field in column field type 506.

Fields type 406 and 506 are field types, which are further qualified by the description contained in descriptions 410 and 510. In other words, descriptions 410 and 510 define the values and fields type 406 and 506 identify the meanings of the values.

FIG. 6 is a block diagram of an offset table in accordance with an exemplary embodiment. Table 600 comprises two (2) columns, offset column 602 and event column 604. Offset column 602 is a table index. Event column 604 defines a text log message associated with the offset in offset column 602. A host management controller, which is the Management Module in the case of a blade server, has the text of event column 604 stored in an internal table of the host management controller. When the host management controller receives a sensor event with an offset equal to the offset in offset column 602, the host management controller will take the text out of the internal table and write the text into an internal log of the host management controller. The host management controller knows what text to store in the internal table because the text is defined in the specification in order to support this sensor event.

Figure 7:
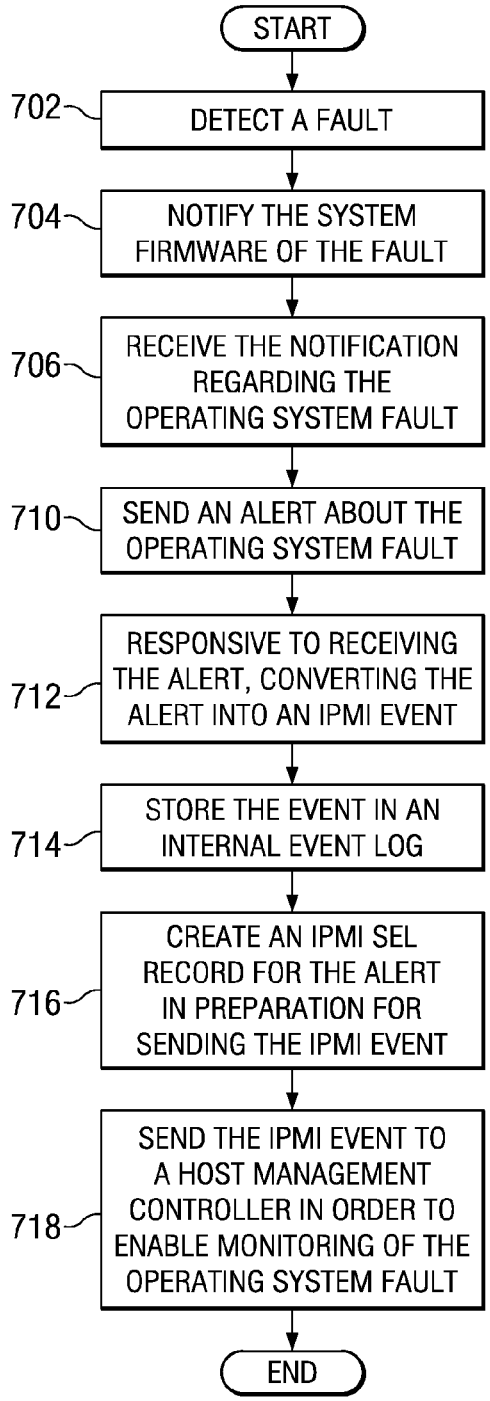
FIG. 7 is a flowchart illustrating an operation for reporting operating system events on an IPMI compliant server in accordance with an exemplary embodiment.

FIG. 7 is a flowchart illustrating an operation for reporting operating system events on an IPMI compliant server in accordance with an exemplary embodiment. The operation of FIG. 7 may be performed by a data processing system such as data processing system 200 in FIG. 2. Specifically steps 702 and 704 may be preformed by an operating system on the data processing system, such as operating system 312 in FIG. 3. Steps 706-710 may be performed by system firmware on the data processing system, such as firmware 318 of FIG. 3. Steps 712-718 may be performed by a BMC on the data processing system such as BMC 324 of FIG. 3.

The operation begins when the operating system detects a fault (step 702). The operating system writes information regarding the fault into an internal log of the operating system. The operating system notifies the system firmware of the fault (step 704). The system firmware receives the notification regarding the operating system fault (step 706). The system firmware sends an alert to the BMC about the operating system fault (step 710). The alert generated by the system firmware may include an indication of the level of severity of the operating system fault. Responsive to the BMC receiving the alert from the system firmware, the BMC converts the alert into an IPMI event (step 712). Specifically, the alert is received by an IPMI compliant sensor, which then converts the alert into an IPMI sensor event. The BMC stores the IPMI event in an internal event log (step 714). The BMC creates an IPMI SEL Record for the alert in preparation for sending the IPMI event (step 716). The BMC then reports the alert by sending an IPMI event to the host management controller in order to enable monitoring of the operating system fault (step 718) and the operation ends.

Figure 8:
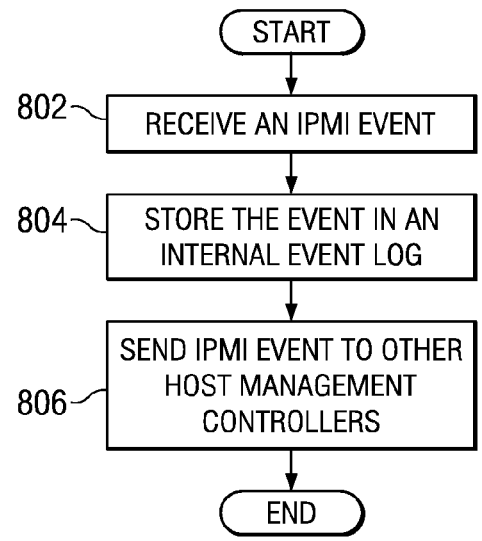
FIG. 8 is a flowchart illustrating the operation of processing an alert for an operating system event on an IPMI compliant server in accordance with an exemplary embodiment.

FIG. 8 is a flowchart illustrating the operation of processing an alert for an operating system event on an IPMI compliant server in accordance with an exemplary embodiment. The operation of FIG. 8 may be performed by a data processing system such as data processing system 200 in FIG. 2. Specifically, the operation may be implemented in a host management controller, such as host management controller 310 in FIG. 3. The operation begins when the host management controller receives an IPMI event (step 802). The IPMI event is sent from a BMC in the server being monitored. The IPMI event is a sensor event, created by an IPMI sensor of the BMC. The host management controller stores the IPMI event in an internal event log (step 804). The internal event log is available for viewing by a user through a user interface. The host management controller can then continue to alert upstream components of the IPMI event, as appropriate, by sending the IPMI event to another host management controller (step 806) and the operation ends. In some cases there may not be any upstream components to alert or the particular event may not require that any other components be alerted. Therefore, step 806 is optional.

Thus, exemplary embodiments provide for reporting operating system events on an IPMI compliant server. Exemplary embodiments take advantage of the ability of the system firmware, also known as BIOS, running on the server to interface to both the operating system that is running on that server, and to the BMC, which then interfaces to a host management controller. An IPMI compliant server uses sensor data records (SDRs) and system event log (SEL) records, which are both defined in the IPMI specification, to define what events to monitor and how to alert on the events that are being monitored.

The invention can take the form of an entirely hardware embodiment, an entirely software embodiment or an embodiment containing both hardware and software elements. In a preferred embodiment, the invention is implemented in software, which includes but is not limited to operating system, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for reporting operating system faults on an Intelligent Platform Management Interface (IPMI) compliant server, the computer-implemented method comprising:
    detecting, by an operating system in a computer system, an operating system fault in the operating system;
    notifying, by the operating system, system firmware included in the computer system of the operating system fault;
    generating, by the system firmware, an alert for the operating system fault;
    responsive to receiving the alert for the operating system fault by an IPMI compliant sensor, converting the alert for the operating system fault into an IPMI event, wherein the sensor is an original equipment manufacturer event reporting mechanism that is unique to a particular manufacturer;
    storing the IPMI event in an internal event log;
    creating an IPMI system event record for the IPMI event; and
    sending the IPMI event to a host management controller in order to enable reporting of the operating system fault.

2. The computer-implemented of claim 1, wherein the operating system is a non-IPMI compliant operating system.

3. The computer-implemented of claim 1, wherein a baseboard manager controller included in the computer system receives the alert and converts the alert into the IPMI event.

4. The computer-implemented of claim 1, further comprising:
    receiving the IPMI event by a host management controller; and
    storing the IPMI event in an internal log of the host management controller, wherein the internal log of the host management controller is accessible by a user through a user interface.

5. The computer-implemented method of claim 4, further comprising:
    sending the IPMI event to another host management controller.

6. The computer-implemented method of claim 1, wherein the IPMI compliant sensor is configured to detect and to receive operating system faults, and wherein the IPMI compliant sensor converts the alert for the operating system fault into the IPMI event.

7. The computer-implemented method of claim 1, further comprising:
    wherein the alert for the operating system fault comprises a level of severity of the operating system fault; and
    wherein the IPMI event includes the level of severity.

8. A computer program product that is stored in a computer-usable medium having computer-usable program code for reporting operating system faults on an Intelligent Platform Management Interface (IPMI) compliant server, the computer program product comprising:
    computer-usable program code for detecting, by an operating system in a computer system, an operating system fault in the operating system;
    computer-usable program code for notifying, by the operating system, system firmware in the computer system of the operating system fault;
    computer-usable program code for generating, by the system firmware, an alert for the operating system fault;
    computer-usable program code, responsive to receiving the alert for the operating system fault by an IPMI compliant sensor, for converting the alert for the operating system fault into an IPMI event, wherein the sensor is an original equipment manufacturer event reporting mechanism that is unique to a particular manufacturer;
    computer-usable program code for storing the IPMI event in an internal event log;
    computer-usable program code for creating an IPMI system event record for the IPMI event; and
    computer-usable program code for sending the IPMI event to a host management controller in order to enable monitoring of the operating system fault.

9. The computer program product of claim 8, wherein the operating system is a non-IPMI compliant operating system.

10. The computer program product of claim 8, wherein a baseboard manager controller included in the computer system receives the alert and converts the alert into the IPMI event.

11. The computer program product of claim 8, further comprising:
    computer-usable program code for receiving the IPMI event by a host management controller; and
    computer-usable program code for storing the IPMI event in an internal log of the host management controller, wherein the internal log of the host management controller is accessible by a user through a user interface.

12. The computer program product of claim 11, further comprising:
    computer-usable program code for sending the IPMI event to another host management controller.

13. The computer program product of claim 8, wherein the IPMI compliant sensor is configured to detect and to receive operating system faults, and wherein the IPMI compliant sensor converts the alert for the operating system fault into the IPMI event.

14. The computer program product of claim 8, further comprising:
    wherein the alert for the operating system fault comprises a level of severity of the operating system fault; and
    wherein the IPMI event includes the level of severity.

15. A data processing system for reporting operating system faults on an Intelligent Platform Management Interface (IPMI) compliant server, the data processing system comprising:
- a bus;
- a communications unit connected to the bus;
- a storage device connected to the bus, wherein the storage device includes computer-usable program code; and
- a processor connected to the bus, wherein the processor executes the computer-usable program code: detect, by an operating system in a computer system, an operating system fault in the operating system; notifies, by the operating system, system firmware in the computer system of the operating system fault; generate, by the system firmware, an alert for the operating system fault; responsive to receiving the alert for the operating system fault by an IPMI compliant sensor, convert the alert for the operating system fault into an IPMI event, wherein the sensor is an original equipment manufacturer event reporting mechanism that is unique to a particular manufacturer; store the IPMI event in an internal event log; create an IPMI system event record for the IPMI event; and send the IPMI event to a host management controller in order to enable monitoring of the operating system fault.

16. The data processing system of claim 15, wherein the operating system is a non-IPMI compliant operating system.

17. The data processing system of claim 15, wherein a baseboard manager controller included in the computer system receives the alert and converts the alert into the IPMI event.

18. The data processing system of claim 15, wherein the processor further executes the computer-usable program code to receive the IPMI event by a host management controller; and store the IPMI event in an internal log of the host controller, wherein the internal log of the host management controller is accessible by a user through a user interface.

19. The data processing system of claim 18, wherein the processor further executes the computer-usable program code to send the IPMI event to another host management controller.

20. The data processing system of claim 15, wherein the IPMI compliant sensor is configured to detect and to receive operating system faults, and wherein the IPMI compliant sensor converts the alert for the operating system fault into the IPMI event.

* * * * *